United States Patent Office 3,271,249
Patented Sept. 6, 1966

3,271,249
DIHALOBENZIMIDAZOLES FOR POULTRY DISEASE TREATMENT
John Martin Clegg, Upper Montclair, and Bernard Beau Brown, Westfield, N.J., assignors to S. B. Penick & Co., Inc., New York, N.Y., a corporation of Delaware
No Drawing. Filed June 24, 1963, Ser. No. 290,165
12 Claims. (Cl. 167—53.1)

This invention relates to treatments for the prevention, control and mitigation of protozoan diseases and more specifically it is concerned with the control of Coccidiosis and Histomoniasis in poultry.

Coccidiosis and Histomoniasis are widely prevalent problems in the raising of poultry. They are protozoan infections attacking the digestive tract and are particularly toxic to young poultry between the ages of 2 to 14 weeks. The diseases are characterized by intestinal damage, hemorrhage, cecal congestion, etc. which causes extensive destruction of poultry flocks and substantial economic losses.

Coccidiosis is of greatest economical import in chicken husbandry. It is caused by several species of protozoan parasites of the genus Eimeria, such as *E. tenella, E. necatrix, E. acervulina, E. maxima, E. hagani,* and *E. brunetti.*

*E. tenella* is the causative agent of acute cecal coccidiosis which is a severe and often fatal infection of the ceca of chickens. Manifestations of acute cecal coccidiosis are severe and extensive hemorrhage, accumulation of blood in the ceca and passage of blood in the droppings. In untreated birds the mortality may run as high as 95%. In addition, survivors of infections are characterized by poor weight gain, poor conformation and reduced feed-efficiency.

*E. necatrix* and the other species coccidia primarily cause the intestinal type of coccidiosis. They may be either the acute or chronic type; the former often causing death from 5 to 7 days after infection and the latter resulting in lingering illness terminating in death.

Chicks, heavily infected with cecal or intestinal coccidiosis, become droopy, look unthrifty and usually have ruffled feathers, pale beaks and pale shanks. They eventually become so emaciated that death follows. The mortality rate is very high and may occur very suddenly. A farmer's entire investment may be lost in a matter of 2 to 3 weeks. Older birds that have become immune to the disease are a constant source of reinfection as is a previously infested range since the spores are resistant to the elements for several seasons.

Histomoniasis, also known as "Turkey Blackhead" or infectious enterohepatitis, is a turkey disease caused by the protozoan *Histamonas meleagridis*, a flagellate having an amoeboid stage. The protozoan is harbored and spread by the common poultry cecal worm, *Heterakis gallinae,* found in the ceca of chickens and turkeys. The disease is spread by the ingestion of the cecal worms passed in droppings of previous generations.

The disease spreads so rapidly and is so disastrous in its course that it is considered the prime cause for the abandonment of turkey husbandry in sections of eastern and midwestern United States. Characteristic symptoms area weakness, drooping, and a sulfur-colored diarrhea. Turkeys of all ages are susceptible but heaviest losses are encountered among young flocks. In such flocks the mortality is often 100 percent. The average mortality from an outbreak is about 50 percent unless strict hygienic and other control measures are adapted.

This invention is based on the discovery that halobenzimidazoles having the formula

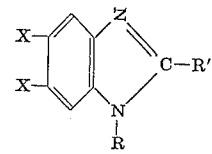

(I)

where X is halogen, preferably chlorine or bromine, and where R and R' are hydrogen, alkyl, hydroxyalkyl, dialkylaminoalkyl, mercaptoalkyl and aralkyl and the pharmacologically acceptable acid addition salts and quaternaries of such polyhalobenzimidiazoles, when administered by the oral route admixed with a normal poultry nutriment, are effective in the control of Coccidiosis and Histomoniasis. The compositions consisting of these halobenzimidazoles or their derivatives, admixed in the normal poultry ration have been found effective in the treatment of established protozoan poultry infections as well as in the prevention of such infections.

In the Formula 1 above, R and R' may include the aliphatic and alicyclic radicals methyl, ethyl, propyl, cyclopropyl, isopropyl, butyl, cyclopentyl, cyclohexyl, octyl and dodecyl; the hydroxy alkyl radicals hydroxymethyl, α-hydroxy ethyl, β-hydroxyethyl, γ-hydroxypropyl, α-hydroxybenzyl; the dialkylaminoalkyl radicals dimethylamino methyl, dimethylaminoethyl, diethylaminoethyl, diethylaminoethyl, dimethylaminopropyl, bis - N,N-(β-hydroxyethyl)aminomethyl, bis - N,N-(β-hydroxyethyl)aminoethyl, bis - N,N - (hydroxy methyl) aminomethyl, bis-N,N-(β-hydroxyethyl)aminopropyl, bis-N,N-(β-chloroethyl)aminomethyl, bis-N,N-(β-chloroethyl)aminoethyl, bis - N,N-(β - chloroethyl)aminopropyl, and where the dialkylamino radical may in the form of a ring such as morpholinomethyl, morpholinoethyl, piperidinomethyl, piperidinoethyl; the mercaptoalkyl radicals, the mercaptomethyl, β-mercaptoethyl, γ-mercaptopropyl; the aralkyl radicals benzyl, phenethyl and diphenylmethyl.

The polyhalobenzimidazole-containing compositions of this invention have been tested in comparison with known and/or commercially employed coccidiostats and have been found to be at least as effective in controlling the symptoms and mortality from the disease. The compounds which have been used for comparison include 3,5 - dinitro-o-toluamide, (Zoalene), 5-nitrobenzimidazole (U.S. Patent 3,054,722) and (4-amino-2-propyl-5-pyrimidyl)methyl-2'-picolinium chloride (Amprolium).

The halogenated benzimidazoles for this invention are readily prepared by the reaction of the corresponding halogenated o-phenylenediamine or its hydrochloride with a carboxylic acid where X is a halogen:

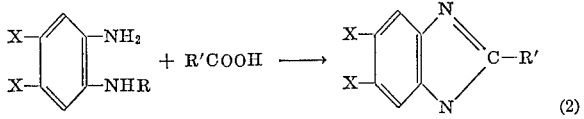

(2)

The acid addition salts of these benzimidazoles are prepared by reacting the benzimidazole base with a mineral or organic acid to form the salt. To form the benzimidazolium compound, the base is reacted with the appropriate quaternizing agent. Both these salt-forming reactions, the acid addition salt and the benzimidazolium salt are best carried out in inert solvents.

The initial reaction of the polyhalodiaminobenezene with the acid takes place very readily in acidified aqueous solutions. The reaction runs substantially to completion within a period of four to six hours. The resultant benzimidazole base is substantially insoluble in alkaline solutions and can be isolated from the reaction medium by raising the pH. To convert the polyhalobenzimidazoles to their acid salts, the free base, dissolved in acetonitrile, is reacted with the appropriate acid.

The benzimidazolium compounds are prepared by reacting a solution of haloquaternizing agent or its addition salts with a solution of the polyhalobenzimidazole. A preferred solvent for this reaction is acetonitrile. Other solvents for the quaternizing agent or the free base may also be used.

It has also been noted that compounds having lower alkyl substituents at the 1 and 2 positions of the 5,6-dihalobenzimidazole moiety also possess coccidiostatic qualities but that since the water and tissue fluid-solubility of such compounds is lower than that of the unsubstituted 5,6-dihalobenzimidazoles, their activity against coccidiosis is also lower. Such alkyl substituted dihalobenzimidazoles, while not quantitatively as active, are deemed qualitatively equivalent to the compounds defined in Formula 1. Such compounds are prepared by the general method set forth above at Equation 2. When a 1-alkyl substituted dihalobenzimidazole is to be prepared, an appropriate N-substituted-o-penhylenediamine is used as the starting material. When 2-alkyl-substituted dihalobenzimidazoles are to be prepared, the appropriate aliphatic acid is used.

The preparation of some of the preferred coccidiostatic agents is described in the appended examples. The examples are merely illustrative and are not meant in any way to confine the scope of this invention. It should be understood that each of the compounds within the scope of this invention has certain advantages for certain specific purposes. Further, where specific terminology is used or specific materials are mentioned, it is understood that the invention is not restricted to such terms or materials but that all useful and functional equivalents of such terms and materials are intended and included thereby.

EXAMPLE 1.—5,6-DICHLOROBENZIMIDAZOLE

Reflux a mixture of 0.5 mole of 4,5-dichloro-o-phenylenediamine with 0.75 mole of 85% formic acid and 500 ml. each of concentrated hydrochloric acid and water. After the period of 4 to 6 hours, dilute the solution with 2 liters of water, treat with charcoal and filter. The filtrate is made alkaline with stirring to a pH of 10–11. The product is cooled to room temperature, refiltered and washed with water. 5,6-dichlorobenzimidazole having a melting point of 199–202° centigrade is obtained in nearly quantitative yield. On crystallization from xylene, it yields a product having a melting point 206–208° centigrade. [This agrees with the melting point in the literature for this compound. J. Pharm. Pharmacol., 3, 420 (1951)].

EXAMPLE 2.—5,6-DICHLOROBENZIMIDAZOLE HYDROCHLORIDE

Dissolve 5,6-dichlorobenzimidazole (product from Example 1) in 20 times its weight of acetonitrile and bubble hydrogen chloride gas through the solution. The resulting precipitate is filtered. The hydrochloride salt should contain 15.84–15.88% of ionizable chloride. The theoretical ionizable chloride is 15.86%.

EXAMPLE 3.—3-(4' - AMINO - 2' - N - PROPYL - 5'-PYRIMIDINYL)-METHYL-5,6 - DICHLOROBENZIMIDAZOLIUM BROMIDE DIHYDROBROMIDE

Dissolve equimolecular amounts of 5,6-dichlorobenzimidazole (from Example 1) and 4-amino-5-bromethyl-2-n-propyl-pyrimidine-hydrobromide in methanol. Add acetonitrile (in equal volume to methanol) and distill off the methanol. The insoluble product is then filtered and dried.

EXAMPLE 4.—5,6-DICHLORO-3-METHYLBENZIMIDAZOLIUM IODIDE

Add 40 grams of methyl iodide to 75 grams of 5,6-dichlorobenzimidazole dissolved in acetonitrile. Reflux to insure completion of reaction and filter the product. The purified product (recrystallized from ethanol) has a melting point 198° C. with some darkening noted.

EXAMPLE 5.—5,6-DICHLOROBENZIMIDAZOLE TARTRATE

Charge a reaction vessel with 0.5 mole of tartaric acid and then introduce 93 grams (0.5 mole) of 5,6-dichlorobenzimidazole. Stir and heat the two dry solids until they melt to a clear liquid. Continue stirring and slowly cool to room temperature as the melt freezes to form a dry powder. The neutralization equivalent should be within at least 5% of theoretical (337.1).

EXAMPLE 6.—5,6-DICHLOROBENZIMIDAZOLE STEARATE

Substituting 0.5 mole of stearic acid (140 grams) for the tartaric acid of Example 5 and using the melt procedure of Example 5 yields 5,6-dichlorobenzimidazole stearate having a neutralizing equivalent within 3% of theoretical (471.5).

The anticoccidial effect of the compounds active in this invention when tested as set forth below, vary from some that are equipotent to 5-nitrobenzimidazole (U.S. Patent 3,054,722) to some that surpasse 3,5-dinitrotoluamide (Zoalene), a present commercial standard. In general, it has been found that the more potent of the polyhalobenzimidazoles are those with the greatest degree of tissue fluid solubility.

The preferred compositions of this invention are those where a concentration of between 0.001% to 0.050% of the active anticoccidiodial compound provides protection from mortality and reduces the amount and character of the animal droppings which provide a diagnostic basis for the disease. In addition, in turkey "blackhead" similar concentrations provide for normal cecal action and restore the birds to normal vigor and tone.

The preferred anticoccidial compounds are 5,6-dichlorobenzimidazole, its mineral acid salts, such as the hydrochloride and certain 5,6-dichlorobenzimidazolium compounds, specifically the 3-(4'-amino-2'-lower alkyl-5'-pyrimidinyl)-methyl-5,6-dichlorobenzimidazolium halide and the mono- or dihydrohalide salts thereof. The "2'-lower alkyl radical" mentioned may be methyl, ethyl or propyl radicals. The preferred salts of these benzimidazolium compounds are the chlorides, hydrochloride and dihydrochlorides and their bromine counterparts.

In general, compounds for inclusion of the composition of this invention and prepared according to the examples set forth above include:

5,6-dichlorobenzimidazole
5,6-dibromobenzimidazole
5,6-diiodobenzimidazole
4,5,6-trichlorobenzimidazole
4,5-dichlorobenzimidazole
4,6-dichlorobenzimidazole
4,7-dichlorobenzimidazole
4,5,7-trichlorobenzimidazole
4,5,6-tribromobenzimidazole
5,6-dichloro-4-bromobenzimidazole
1-methyl-5,6-dichlorobenzimidazole
1-ethyl-5,6-dichlorobenzimidazole
1-propyl-5,6-dichlorobenzimidazole
1-dimethylaminoethyl-5,6-dichlorobenzimidazole
2-methyl-5,6-dichlorobenzimidazole
2-hydroxymethyl-5,6-dichlorobenzimidazole
2-$\beta$-hydroxyethyl-5,6-dichlorobenzimidazole
2-$\alpha$-hydroxymethyl-5,6-dichlorobenzimidazole An anticoccidial effect is only marginally present in 5-(6)-chlorobenzimidazole, its salts, quaternaries and quaternary salts but is much more pronounced in 5,6-dichlorobenzimidazole and its derivatives within the scope of this invention. The 5-(6)-chlorobenzimidazole is at least as potent in protecting chicks from mortality as is 5-(6)-nitrobenzimidazole (U.S. Patent 3,054,722) but the 5,6-dichlorobenzimidazole appears additionally to protect the chick not only from mortality but from the usual morbidity associated with the disease such as bloody dropping, reduced weight gain, and cecal congestion.

Among the derivatives of 5,6-dichlorobenzimidazole, it was found that alkyl groups at the 1 and 2 positions of the ring had little adverse effect on anticoccidial properties of the generic class of compounds set forth beyond what might be expected from changing the palatability or solubility of the patent compound. Aryl groups at the 2-position eliminate anticoccidial effects.

Representative compounds of various classes within the scope of this invention are set forth in Table 1 together with a tabulation of their melting points or other constants. All the active compounds in compositions within the scope of this invention were as effective or more effective than 5-nitrobenzimidazole of U.S. Patent 3,054,722.

*Table 1*

The compounds of this invention are administered to two week old Cornish-Rock chicks. The results for the preferred compounds are reported in Table 2 below. The chicks were maintained on the medicated feed (starter-mash) and the weight gain ascertained after four days. This provides a measure of the palatability or toxicity of the medication to uninfected birds. The chicks were orally inoculated on the fourth day with a uniform amount of sporulated *E. tenella* calculated to give a mortality of about 50% of the infected, unmedicated birds. Surviving chicks were weighed, sacrificed and pathologically examined on the seventh day after inoculation. Dead birds were weighed and "posted" on the day of death.

The percentage weight gains exhibited by the survivors, as compared to unmedicated, uninoculated controls, is a measure of the anticoccidial activity as it affects the general condition of the birds. (Uninoculated controls exhibit a weight gain of 70% to 80%). Other measures of anticoccidial activity are the percentage of survivals and cecal and blood scores. The percentages of survivors after inoculation are a self-evident measure of anticoccidial effect. The cecal blood scores are comparative scores based on the observed symptoms of cecal coccidiosis.

The cecal score is a numerical rating based on the physical findings of cecum on post mortem and is rated as follows:

1.8—No lesions and a functional cecum (1.8 grams is the normal cecum weight for a four week old bird).
2—Cecum not functioning, mild lesions reduced in length.
2.0–4—These scores are based on the average weight of the congested cecum on post mortem. The score of 4 is also assigned to all birds that die of cecal coccidiosis. Similarly it is a maximum for badly infected birds, indicating complete congestion in the cecum.

The blood score is similarly based on a qualitative comparison with inoculated, unmedicated birds.

0—No blood in the pan droppings.
1—Significant traces of blood in the pan droppings.
2–5—Relative scores with 5 indicating extensive hemorrhaging and complete lack of control of the parasite. (4 is the average score for inoculated bird showing an uncontrolled infection with moderate hemorrhaging.

While the invention has been illustrated by the foregoing examples of active materials, it will be apparent that various equivalent changes and modifications may be resorted to in carrying out this invention without departing from the scope and spirit thereof and it will be understood that such equivalent embodiments are within the purview of the annexed claims.

*Table 2*

In general the more active compounds such as 5,6-dichlorobenzimidazole, its hydrochloride and its soluble quaternary compounds should be present in concentrations exceeding 100 p.p.m. of ration. Depending upon the ages of the chick to which it is administered and their body weight, this corresponds to a daily drug intake of from 5 mgs./kilograms to as much as 20 mgs./kilo of body weight at the lowest concentration level. This is based on the assumption that the average chick will ingest up to an equivalent of about 15% of its body weight as its daily food ration.

As the chick matures into a chicken, the ratio of food intake to the body weight of drug decreases and the level of 5 mg./kg. of body weight of drug is achieved. Of course, the medication may be administered at higher levels and especially with the less potent compounds, it may be adjusted on an activity-based ratio. Such higher concentrations (up to as much as 1% by weight of feed) may be administered with the less potent compounds as a general diet. With the more active compounds, a single feeding containing 1% by weight of the drug may be administered for short periods when there is evidence of exposure to, or of widespread infection in the poultry flock. In two week old birds, such a concentration of medication may amount to as high as 1.25 to 1.5 grams of medication per kilogram of body weight.

Occasionally, when it is desired to administer the medication in water ration, the medication may be dissolved, dispersed or emulsified through the water supply for the poultry flock. The medication may be formulated with nontoxic solvents, oils and surfactants to assure an even dispersion in the water supply at concentrations sufficient to provide adequate dosage of the active ingredients.

TABLE I.—POLYHALOBENZIMIDAZOLE POULTRY TREATMENT

| | Empirical Formula | M.P.°C. |
|---|---|---|
| BASES | | |
| 5,6-dichlorobenzimidazole | $C_7H_4Cl_2N_2$ | 206-208 |
| 1-methyl-5,6-dichlorobenzimidazole | $C_8H_6Cl_2N_2$ | 174 |
| 1-ethyl-5,6-dichlorobenzimidazole | $C_9H_8Cl_2N_2$ | 102-103 |
| 1-dodecyl-5,6-dichlorobenzimidazole | $C_{19}H_{28}Cl_2N_2$ | 86.5-87.5 |
| 1-benzyl-5,6-dichlorobenzimidazole | $C_{14}H_{10}Cl_2N_2$ | 141-142 |
| 2-benzyl-5,6-dichlorobenzimidazole | $C_{14}H_{10}Cl_2N_2$ | 189-191 |
| 2-methyl-5,6-dichlorobenzimidazole | $C_8H_6Cl_2N_2$ | 244-245 |
| 2-hydroxymethyl-5,6-dichlorobenzimidazole | $C_8H_6Cl_2N_2O$ | 270-271 |
| 2-α-hydroxybenzyl-5,6-dichlorobenzimidazole | $C_{14}H_{10}Cl_2N_2O$ | 219-220 |
| 2-β-hydroxyethyl-5,6-dichlorobenzimidazole | $C_9H_8Cl_2N_2O$ | 289-294 |
| 2-γ-hydroxypropyl-5,6-dichlorobenzimidazole | $C_{10}H_{10}Cl_2N_2O$ | 187-189 |
| 2-cyclopropyl-5,6-dichlorobenzimidazole | $C_{10}H_8Cl_2N_2$ | 265-267 |
| 2-mercaptomethyl-5,6-dichlorobenzimidazole | $C_8H_6Cl_2N_2S$ | >300 |
| 1-methyl-2-hydroxymethyl-5,6-dichlorobenzimidazole | $C_9H_8Cl_2N_2O$ | 195 |
| 1-ethyl-2-methyl-5,6-dichlorobenzimidazole | $C_{10}H_{10}Cl_2N_2$ | 109.5-110 |
| 1,2-dimethyl-5,6-dichlorobenzimidazole | $C_9H_8Cl_2N_2$ | 200 |
| 2-bis-N,N-(β-hydroxyethyl)aminomethyl-5,6-dichlorobenzimidazole | $C_{12}H_{15}Cl_2N_3O_2$ | 160-161 |
| 2-bis-N,N-(β-chloroethyl)aminomethyl-5,6-dichlorobenzimidazole hydrochloride | $C_{12}H_{14}Cl_5N_3$ | 171-173 |
| 2-morpholinomethyl-5,6-dichlorobenzimidazole | $C_{12}H_{13}Cl_2N_3O_2$ | 165-166 |
| 2-piperidinomethyl-5,6-dichlorobenzimidazole | $C_{13}H_{15}Cl_2N_3$ | 198-199 |
| 1-bis-N,N-γ-dimethylaminopropyl-5,6-dichlorobenzimidazole hydrochloride hydrate | $C_{12}H_{18}Cl_2N_3O$ | 232-235 |
| 1-β-hydroxyethyl-5,6-dichlorobenzimidazole | $C_9H_8Cl_2N_2O$ | 162 |
| SALTS | | |
| 5,6-dichlorobenzimidazole hydrochloride | $C_7H_5Cl_3N_2$ | >300 |
| | | Neutralization Equivalent |
| 5,6-dichlorobenzimidazole stearate | $C_{25}H_{40}Cl_2N_2O_2$ | Calc., 471.5 Found, 472.5 |
| 5,6-dichlorobenzimidazole tartrate | $C_{11}H_{10}Cl_2N_2O_6$ | Calc., 337.1 Found, 326.8 |
| | | Analysis, Percent Cl |
| | | Found / Calc. |
| QUATERNARIES | | |
| 3-(4'-amino-2'-methyl-5 pyrimidyl)methyl-5,6-dichlorobenzimidazolium chloride dihydrochloride | $C_{13}H_{14}Cl_5N_5$ | 40.0 / 42.5 |
| | | Percent N |
| 3-(4'-amino-2'-n-propyl-5'-pyrimidyl)methyl-5,6-dichlorobenzimidazolium bromide dihydrobromide | $C_{15}H_{18}Br_3Cl_2N_5$ | 12.19 / 12.10 |
| 3-(4'-amino-2'methyl-5-pyrimidyl)methyl-1-ethyl-5,6-dichlorobenzimidazolium chloride dihydrochloride | $C_{16}H_{20}Cl_5N_5$ | 15.71 / 15.24 |
| 3-(4'-amino-2'-n-propyl-5'-pyrimidyl)methyl-1-ethyl-5,6-dichlorobenzimidazolium bromide hydrobromide | $C_{17}H_{12}Br_2Cl_2N_5$ | 12.85 / 13.31 |
| 3-(4'-amino-2'-n-propyl-5'-pyrimidyl)methyl-2-hydroxymethyl-5,6-dichlorobenzimidazolium bromide dihydrobromide | $C_{16}H_{20}Br_3Cl_2N_5O$ | 10.80 / 11.50 |
| | | M.P., °C. |
| 3-(4'-amino-2'-n-propyl-5'-pyrimidyl)methyl-2-phenylhydroxymethyl-5,6-dichlorobenzimidazolium bromide hydrobromide | $C_{22}H_{22}Br_2Cl_2N_5O$ | (dec.) 210-215 |
| 3-(4'-amino-2'-n-propyl-5'-pyrimidyl)methyl-2-β-hydroxyethyl-5,6-dichlorobenzimidazolium bromide hydrobromide | | (dec.) 210-215 |
| 5,6-dichloro-3-methylbenzimidazolium iodide | $C_8H_7Cl_2IN_2$ | 198 |
| 5,6-dichloro-3-methylbenzimidazolium methosulfate | $C_9H_{10}Cl_2N_2O_4S$ | 229-230 |
| 5,6-dichloro-1,3-dimethylbenzimidazolium iodide | $C_9H_9Cl_2IN_2$ | >300 |

TABLE 2

| | Percent Drug Concentration in Feed | Percent Gain | | Number of Deaths | | Cecal Score | | Blood Score | |
|---|---|---|---|---|---|---|---|---|---|
| | | Medicated | Positive[1] Controls | Medicated | Positive[1] Controls | Medicated | Positive[1] Controls | Medicated | Positive[1] Controls |
| 5,6-dichlorobenzimidazole (Example I) | 0.0125 | 55 | 25 | 1 | 7 | 2.2 | 4.0 | 0 | 5 |
| | 0.0250 | 44 | 25 | 1 | 7 | 1.5 | 4.0 | 0 | 5 |
| 5,6-dichlorobenzimidazole Hydrochloride (Example II) | 0.0125 | 63 | 25 | 0 | 7 | 1.9 | 4.0 | 0 | 5 |
| | 0.0250 | 43 | 25 | 0 | 7 | 1.7 | 4.0 | 0 | 5 |
| 3-(4'-amino-2'-methyl-5'-pyrimidyl) methyl-5,6-dichlorobenzimidazolium Chloride dihydrochloride | 0.0125 | 52 | 25 | 4 | 7 | 3.2 | 4.0 | 2 | 5 |
| | 0.0250 | 70 | 25 | 0 | 7 | 1.7 | 4.0 | 0 | 5 |

[1] Positive Controls—Infected, unmedicated birds.
NOTE.—Negative Controls—Uninfected, unmedicated birds. These showed 80% weight gain, no deaths, and cecal and blood scores of 1 and 0 respectively.

We claim:

1. A feed composition comprising a major portion of poultry feed containing intimately mixed therein an amount necessary to combat and control coccidiosis and histamoniasis in poultry of a compound selected from the class of benzimidazoles having the formula

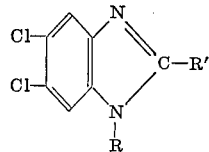

where R and R' are selected from the group consisting of hydrogen, lower alkyl, hydroxy-lower alkyl, di-lower-alkyl-amino-lower-alkyl, mercapto-lower-alkyl, benzyl, phenethyl and diphenylmethyl, and their pharmacologically acceptable quaternary ammonium and acid addition salts.

2. The composition according to claim 1 wherein the benzimidazole comprises at least 0.001% by weight of the poultry feed composition.

3. A poultry feed composition for controlling and preventing coccidiosis comprising poultry feed having mixed and dispersed therethrough an amount necessary to combat and control coccidiosis in poultry of a compound chosen from the group consisting of 5,6-dichlorobenzimidazole and its acceptable quaternary ammonium and acid addition salts.

4. The composition according to claim 3 wherein the 5,6-dichlorobenzimidazole admixed, is present in an amount of at least about 0.001% by weight of the poultry feed composition.

5. A poultry feed composition comprising a basal ration having intimately admixed therewith an amount necessary to combat and control coccidiosis in poultry and which constitutes at least 0.001% by weight of 5,6-dichlorobenzimidazole.

6. A poultry feed composition comprising a basal ration having intimately admixed therewith an amount necessary to combat and control coccidiosis in poultry and which constitutes at least 0.001% by weight of 5,6-dichlorobenzimidazole hydrochloride.

7. A poultry feed composition comprising a basal ration having intimately admixed therewith an amount necessary to combat and control coccidiosis in poultry and which constitutes at least 0.001% by weight of 3-(4'-amino - 2' - n-methyl-5'-pyrimidinyl)methyl-5,6-dichlorobenzimidazolium bromide dihydrobromide.

8. The method for combatting and controlling the avian protozoan diseases coccidiosis and histamoniasis which comprises administering to poultry a composition containing an amount necessary to combat and control coccidiosis and histamoniasis in poultry of a compound chosen from the class of benzimidazoles having the formula

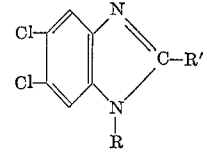

where R and R' are selected from the group consisting of hydrogen, lower alkyl, hydroxy-lower-alkyl, di-lower-alkyl-amino-lower-alkyl, mercapto-lower-alkyl, benzyl, phenethyl and diphenylmethyl, and their pharmacologically acceptable quaternary ammonium and acid addition salts.

9. The method of combatting and controlling the avian protozoan diseases Coccidiosis and Histamoniasis which comprises administering to poultry in their feed an amount necessary to combat and control coccidiosis and histamoniasis in poultry of a compound chosen from the group consisting of 5,6-dichlorobenzimidazole, its pharmacologically acceptable quarternary ammonium salts and acid-addition salts, said compound being present in said feed in a concentration exceeding 0.001% by weight.

10. The method of preventing coccidiosis which comprises feeding poulty a feed having dispersed therein an amount necessary to combat and control coccidiosis in poultry and which constitutes at least 0.001% by weight of 5,6-dichlorobenzimidazole.

11. The method of preventing coccidiosis which comprises feeding to poultry a feed containing dispersed therein an amount necessary to combat and control coccidiosis in poultry and which constitutes at least 0.001% by weight of 5,6-dichlorobenzimidazole hydrochloride.

12. The method of preventing coccidiosis which comprises feeding to poultry a feed containing dispersed therein an amount necessary to combat and control coccidiosis in poultry and which constitutes at least 0.001% by weight of 3(4'-amino-2'-n-methyl-5'-pyrimidinyl)methyl-5,6-dichlorobenzimidazolium bromide dihydrobromide.

References Cited by the Examiner

Chem. Abst., Fifth Decennial Index, 1947–1956, page 1632.

JULIAN S. LEVITT, Primary Examiner.

FRANK CACCIAPAGLIA, JR., Examiner.

S. ROSEN, Assistant Examiner.